United States Patent

[11] 3,616,371

| [72] | Inventors | Hiroshi Ukihashi<br>Tokyo;<br>Masahiko Ichimura, Yokohama-shi, both of Japan |
|---|---|---|
| [21] | Appl. No. | 737,336 |
| [22] | Filed | June 17, 1968 |
| [45] | Patented | Oct. 26, 1971 |
| [73] | Assignee | Asahi Glass Company, Ltd.<br>Chiyoda-ku, Tokyo, Japan |
| [32] | Priority | Aug. 5, 1967 |
| [33] | | Japan |
| [31] | | 42/50212 |

[54] PROCESS FOR THE PRODUCTION OF HOMOPOLYMER OF VINYLIDENE FLUORIDE OR COPOLYMERS THEREOF IN THE PRESENCE OF A FLUORINE-CONTAINING HYDROCARBON SOLVENT
17 Claims, No Drawings

[52] U.S. Cl. .................................................... 204/159.22,
260/80.77, 260/86.3, 260/87.1, 260/87.7, 260/92.1
[51] Int. Cl. ...................................................... B01j 1/00,
C08d 1/00
[50] Field of Search ........................................... 204/159.22;
260/92.1, 87.7

[56] References Cited
UNITED STATES PATENTS

| 3,342,777 | 9/1967 | Howard, Jr. .................. | 204/159.22 |
| 3,305,464 | 2/1967 | Marans ......................... | 204/159.21 |
| 3,058,899 | 10/1962 | Yanko et al. .................. | 204/159.22 |
| 3,519,703 | 7/1970 | Mernl et al. .................. | 260/890 |
| 3,437,648 | 4/1969 | Dietrich ....................... | 260/92.1 |

FOREIGN PATENTS

| 590,817 | 7/1947 | Great Britain ............... | |

OTHER REFERENCES

Manno; Search for New Fluoropolymers, Nucleanics, Vol. 22, No. 6, June, 1964, pp. 64– 67.

Primary Examiner—Murray Tillman
Assistant Examiner—Richard B. Turer
Attorneys—Ralph E. Bucknam, Jesse D. Reingold, Robert R. Strack and Henry A. Marzullo, Jr.

ABSTRACT: Process for homopolymerizing vinylidene fluoride or copolymerizing it with at least one other polymerizable compound such as hexafluoropropylene, chlorotrifluoroethylene, vinyl chloride or the like, characterized by the fact that the polymerization reaction is carried out mainly in the liquid phase in a condensed system containing the material to be polymerized and a fluorine-containing hydrocarbon solvent such as trichlorotrifluoroethanes, octafluorocyclobutane or the like, by the irradiation of ionizing radiation.

PROCESS FOR THE PRODUCTION OF HOMOPOLYMER OF VINYLIDENE FLUORIDE OR COPOLYMERS THEREOF IN THE PRESENCE OF A FLUORINE-CONTAINING HYDROCARBON SOLVENT

BACKGROUND OF THE INVENTION

1. Field of the Invention

This invention relates to a process for the production of homopolymers of vinylidene fluoride for copolymers of vinylidene fluoride with at least one unsaturated compound polymerizable therewith. More particularly, this invention relates to the radiation induced polymerization of vinylidene fluoride or copolymerization of vinylidene fluoride and one or more of the polymerizable compounds in a condensed system containing the compound or compounds to be polymerized and a fluorine-containing hydrocarbon solvent.

2. Description of the Prior Art

It has hitherto been known to produce homopolymers of vinylidene fluoride or copolymers of vinylidene fluoride and other polymerizable compounds by suspension polymerization or emulsion polymerization of vinylidene fluoride or of a mixture thereof with certain unsaturated compounds polymerizable therewith in an aqueous medium containing a catalyst for polymerization, emulsifier, buffer agent, and others. However, according to the conventional process referred to above, it is necessary that polymerization reactions are conducted under high pressure, and it is generally difficult to attain an industrially satisfactory yield of polymerization product. Since the polymerization product obtained by the above conventional process is contaminated by the buffer agent, emulsifier, catalyst, and others, it is necessary to remove such contaminating impurities from the polymerization product by such complicated operation as filtering, washing, or drying. Furthermore, the above process has a disadvantage that the polymerization products do not necessarily possess good physical and chemical properties because of the contamination with the impurities mentioned hereinabove.

It has also been known that homopolymers of vinylidene fluoride or copolymers of vinylidene fluoride and other polymerizable compounds can be produced by radiation-induced bulk polymerization of vinylidene fluoride or of a mixture thereof with various other compounds polymerizable therewith (for instance, refer to Nucleonics Vol. 22, No. 6—June, 64–67, 1964). Such a production method has been found to have disadvantage that the polymerization reaction is not controllable and gives a low conversion of vinylidene fluoride or a mixture thereof with the other polymerizable compounds to the corresponding polymerization product. And also, in the above radiation-induced bulk polymerization, it has been required that the conversion of polymerizable materials to polymerization products be held low so that the products are homogeneous ones which possess good physical and chemical properties. Furthermore, the above radiation-induced bulk polymerization has the disadvantage that the polymerization reaction rate is low and the yield of polymerization products is very low. Consequently, such radiation-induced bulk polymerization could not have been applied to the industrial production of homopolymers of vinylidene fluoride or copolymer of vinylidene fluoride with other polymerizable compounds. BRIEF SUMMARY OF THE INVENTION An object of this invention is to provide a new process which makes it possible to produce vinylidene fluoride polymers by radiation-induced polymerization with an industrially satisfactory yield.

Another object of this invention is to provide a new process which makes it possible to produce vinylidene fluoride polymers by radiation-induced polymerization at a high polymerization reaction rate.

Another object of this invention is to provide a process wherein the polymerization reaction is very controllable with respect to the reaction temperatures or pressures.

Still another object of this invention is to provide a process which makes it possible to produce the homogeneous vinylidene fluoride polymers possessing good physical and chemical properties, with an industrially satisfactory polymer yield.

A further object of this invention is to provide a process which makes it possible to avoid the contamination of polymers by a buffer agent, emulsifier, catalyst, and others.

Still a further object of this invention is to provide a process wherein the complicated operations, such as filtering, washing, or drying, for purifying crude polymerization products are not necessary.

Other objects and advantageous features of this invention will become apparent from the following description of this invention.

These objects are accomplished by carrying out the new process described more fully hereinafter, that is, by the radiation-induced polymerization of vinylidene fluoride or a mixture thereof with unsaturated compounds polymerizable therewith in a condensed system containing a fluorine-containing hydrocarbon solvent.

Herein, in this specification, the term "condensed system" means a system where the temperature and pressure of polymerization and the concentration of compounds to be polymerized are such that most of the polymerization reaction takes place in a liquid mixture containing the compounds, a fluorine-containing hydrocarbon solvent according to this invention, and the resulting polymerization product after the initiation of the polymerization. However, in the condensed system, the gas-phase polymerization reaction is likely to take place very rarely simultaneously with the liquid-phase polymerization, the former being insignificant.

We have found that such homopolymers or copolymers can be obtained by the new process indicated above, with an industrially satisfactory yield at a high polymerization reaction rate.

Generally, in practicing this invention, a reaction vessel is charged with vinylidene fluoride monomer or a mixture thereof with other comonomers and a fluorine-containing hydrocarbon solvent in liquid state, and the mixture so obtained is irradiated with ionizing radioactive rays, such as gamma rays obtained from cobalt 60, in the condensed system. Polymerization reactions, according to this invention, proceed satisfactorily rapidly at normal pressure in the condensed system. And also, according to this invention, polymerization reactions may be conducted well at a reduced or increased pressure. Further, the polymerization reaction can be effected by application of a relatively small dose of ionizing radioactive rays, with a high yield with little difficulty and at a polymerization reaction rate considerably higher than that of the above radiation-induced bulk polymerization. Since the polymerization products according to this invention are not contaminated by a buffer agent, emulsifier, catalyst, and others, they possess excellent physical and chemical properties.

DETAILED DESCRIPTION INCLUDING PREFERRED EMBODIMENTS

The fluorine-containing hydrocarbon solvent useful in the practice of this invention includes fluorochlorinated or fluorinated hydrocarbons having one to four carbon atoms, such as, for instance, trichloromonofluoromethane $CCl_3F$, dichlorodifluoromethane $CCl_2F_2$, dichloromonofluoromethane $CHCl_2F$, monochlorodifluoromethane $CHClF_2$, trichlorotrifluoroethanes $C_2Cl_3F_3$, dichlorotetrafluoroethanes $C_2Cl_2F_4$, monochloropentafluoroethane $C_2ClF_5$, trifluoroethanes $C_2H_3F_3$, difluoroethanes $C_2H_4F_2$, monochlorodifluoroethanes $C_2H_3ClF_2$, dichlorohexafluoropropanes $C_3Cl_2F_6$, octafluorocyclobutane $C_4F_8$, and other.

A mixture of two or more of the fluorine-containing hydrocarbon solvents may also be used in the condensed system according to this invention.

It has now been found that these fluorine-containing hydrocarbon solvents do not interfere with the radiation-induced polymerization or copolymerization in the condensed system. Namely, it has now been found that the above fluorine-containing hydrocarbon solvents can be used as media in the production of high molecular weight polymers, since they will not act as telomerizing agents. Furthermore, it has also been found that the above fluorine-containing hydrocarbon solvents act as a polymerization reaction rate-accelerating solvent in the radiation-induced polymerization of vinylidene fluoride in the condensed system. This rate-accelerating effect is not always recognized in the conventional polymerization system containing no vinylidene fluoride. The reason for the rate-accelerating effect of the fluorine-containing hydrocarbon solvent is not clear theoretically. The mechanism of accelerating the polymerization reaction is not theoretically clear, either. However, it may be presumably considered that the fluorine-containing hydrocarbon solvent is easily activated by irradiation with ionizing radioactive rays, and such activated solvent accelerates the initiation of polymerization reaction because of the energy transfer from the solvent to vinylidene fluoride monomer.

According to this invention, particularly preferred are perfluorochlorohydrocarbons or perfluorohydrocarbons which contain no hydrogen atom in the molecule. The perfluorochlorinated hydrocarbons include trichlorotrifluoroethanes $C_2Cl_3F_3$, dichlorotetrafluoroethanes $C_2Cl_2FA_4$, nonochloropentafluoroethane $C_2ClF_5$, trichloromonofluoromethane $CCl_3F$, dichlorodifluoromethane $CCl_2F_2$, and the like. The perfluorinated hydrocarbons include octafluorocyclobutane $C_4F_8$, and others. These perfluorochlorinated or perfluorinated hydrocarbons are particularly preferred solvents for use in the process of this invention, since they remarkably increase the polymerization reaction rate and the yield of polymerization products when used in the radiation-induced polymerization as the solvent in the condensed system. Furthermore, preferred are the fluorine-containing hydrocarbons which have a boiling point remarkably different from that of vinylidene fluoride and which can easily constitute the condensed system as one of its components under the polymerization conditions.

The fluorine-containing hydrocarbon solvent is normally used in amounts of above 0.1 mol, preferably from 0.2 to 10.0 mol, per mol of monomer material employed (vinylidene fluoride monomer or a mixture thereof with other unsaturated monomers). When the fluorine-containing hydrocarbon solvent used is less than 0.1 mol per mol of monomer material used, the objects of this invention for example, the polymerization reaction rate-acceleration effect of the solvent, will not be obtained. If the fluorine-containing hydrocarbon solvent used is above 10.0 mol per mol of monomer material used, the objects of this invention will be achieved, but in this case a larger reactor would be required and the separation of polymers from the solvent would be difficult.

Such conventional solvents as benzene, chloroform, carbon tetrachloride, tetrachloroethylene, n-hexane, toluene, ethyl methyl ketone, ethanol, dimethylformamide, do not act as a rate-accelerating solvent in the process of this invention. They cannot be used as media in the production of a high molecular weight homopolymer of vinylidene fluoride or copolymers of vinylidene fluoride and other polymerizable compounds according to this invention, since they will act as telomerizing agents, deactivators, or inhibitors in the condensed system. For instance, when benzene is used as a solvent, the polymerization product will not be obtained by using a radiation-induced polymerization process. When carbon tetrachloride or tetrachloroethylene is used as a solvent, only a low molecular weight polymer (or telomer) will be obtained with a polymer yield of below 50 percent. On the other hand, in the case in which trichlorotrifluoroethane is used as a solvent according to this invention, a high molecular weight polymer will be produced with a polymer yield of 100 percent.

Vinylidene fluoride may advantageously be homopolymerized or copolymerized with other polymerizable compounds by the process of this invention. Examplary of the compounds that may be copolymerized with vinylidene fluoride by the process of this invention are vinyl fluoride, tetrafluoroethylene, chlorotrifluoroethylene, hexafluoropropylene, ethylene, propylene, butadiene, styrene, vinyl acetate, vinyl chloride, vinylidene chloride, isobutylene, acrylonitrile, methacrylonitrile, alkyl acrylates, alkyl methacrylates, etc. Among them, particularly preferred unsaturated comonomers are hexafluoropropylene, tetrafluoroethylene, chlorotrifluoroethylene, vinyl chloride, vinyl acetate, and methyl methacrylate. Any of these compounds may be copolymerized or a mixture of any two or more of them may be copolymerized with vinylidene fluoride by the radiation-induced polymerization in the condensed system.

According to this invention, copolymers of vinylidene fluoride with at least one other polymerizable compound, which possess various physical and chemical properties, can be obtained by changing the kind and content of unsaturated comonomers. If the mol ratio of vinylidene fluoride to other compounds polymerizable therewith in the feed is changed, the composition and consequently the properties of the copolymerization product will correspondingly be changed. The homopolymer of vinylidene fluoride obtained by the process of this invention is a homogeneous, high molecular weight polymer which possesses outstanding physical properties, particularly mechanical properties, and chemical resistance. In addition, the homopolymer of vinylidene fluoride mentioned above can easily be used as a coating film forming material, since it is soluble in such extremely polar organic solvents as dimethylformamide, dimethylacetamide, and dimethylsulfoxide. A copolymer of vinylidene fluoride and hexafluoropropylene, obtained by the process of this invention, is a white or transparent elastomer which can be employed over a wide temperature range (−50° C. to +300° C.) without losing its elastomeric properties. The elastomeric properties of this copolymer increase with increase of the hexafluoropropylene content in the copolymer. A copolymer of vinylidene fluoride and chlorotrifluoroethylene is also a white or transparent elastomer possessing outstanding chemical resistance, particularly, to corrosive mineral acids. Furthermore, according to this invention, a better terpolymer of vinylidene fluoride, hexafluoropropylene and tetrafluoroethylene may be obtained.

The polymerization process in accordance with this invention may be carried out over a wide temperature and pressure range. Usually, it is carried out at a temperature from about −80° C. up to about +70° C., preferably from about −80° C. to about +50° C., and preferably within the range of about −60° C. to about +30° C. In the practice of this invention, the lower the reaction temperature, the easier the removal of heat from the polymerization system. However, since a reaction temperature of below −80° C. will decrease the polymerization reaction rate, such a low temperature is not appropriate for industrial purposes. When a reaction temperature is above +70° C., the pressure in the reactor increases and the polymerization reaction becomes uncontrollable. Usually, the polymerization process will be carried out at a normal or autogeneous pressure in the condensed system, but increased pressures may be used if desired and reduced pressures may also be used.

The process of this invention may be carried out in either a continuous or a batchwise manner. For example, the feed of polymerizable materials and solvent, the recovery of polymerization product, or the application of radioactive rays may be conducted continuously and batchwise.

The contamination by oxygen in the polymerization system will considerably decrease the polymerization reaction rate and will cause the polymerization product to deteriorate in properties. Consequently, the polymerization process in accordance with this invention is preferably carried out under conditions where oxygen is excluded.

The ionizing radioactive rays used in practising this invention are electron rays obtained by an electron accelerator and van de Graaff electrostatic generator; γ-rays obtained from cobalt 60, cesium 137, etc.; X-rays; α-rays; and rays from fission fragments; or the like. The irradiating conditions, i.e., does rate and time of irradiation (or total dose) employed in this process are not critical. However, when the total dose is too small, the yield of polymerization products is lowered. Furthermore, a too high dose rate will cause the polymerization product to deteriorate in properties, and a too low dose rate requires a long irradiation time to attain a high yield of polymerization product. Thus, an adequate dose rate is approximately from $1\times10^2$ to $5\times10^6$ roentgen per hour, preferably from $1\times10^3$ to $7\times10^5$ roentgen per hour, and the preferred total dose is approximately from $5\times10^2$ to $1\times10^6$ roentgen, particularly from $1\times10^3$ to $7\times10^5$ roentgen.

In the polymerization according to another aspect of this invention, vinylidene fluoride or a mixture with other copolymerizable comonomers will continue to be polymerized in the condensed system after the irradiation is ceased when it has been partially polymerized, i.e., it will be postpolymerized, at a remarkably high polymerization reaction rate, under nonirradiating conditions and without use of catalyst. For example, the postpolymerization of vinylidene fluoride takes place with a satisfactory velocity at $-20°$ C. without irradiation, which is preceded by the irradiated polymerization at $-40°$ C. for 3 hours. By carrying out the postpolymerization of vinylidene fluoride or a mixture thereof with unsaturated comonomers, the advantages which may be obtained are as follows:

Only a smaller irradiation dosage is required for the total polymerization consisting of the two steps of irradiation polymerization and subsequent nonirradiation polymerization. Accordingly, the amount of monomer and comonomer to be treated per unit of time can be increased when using the same irradiation source since the time required for the irradiation is shortened. In addition, it is possible to facilitate the polymerization reaction in a continuous manner on an industrial scale because the major portion of the polymerization reaction can be effected during the step of the postpolymerization. Therefore, a main polymerization apparatus can conveniently be installed apart from the radiation source, which will also greatly reduce the radiation hazard during the operation.

When the postpolymerization is employed in the process of this invention, an advantageous polymer conversion rate (or polymer yield) in the irradiation step may be 30 percent or less in order to ensure sufficient fluidity to conduct the operation continuously. However, it depends upon the irradiating conditions employed and upon the conditions during the postpolymerization.

The step of the postpolymerization of this invention can be carried out at temperatures from about $-80°$ C. to about $+70°$ C., preferably from about $-40°$ C. to about $+50°$ C. Usually, it may be carried out at a temperature higher than that of the irradiation step.

This invention is further described with reference to the following examples which are illustrative but not limitative thereof.

EXAMPLE 1

An evacuated glass ampoule made of borosilicate glass was charged with 6.4 grams of vinylidene fluoride and 16.1 grams of trichlorotrifluoroethane (solvent) in the liquid state, and the ampoule was sealed after the air had been drawn off from it. While keeping the ampoule in a freezing mixture of dry ice and methanol, the ampoule was exposed for about nine hours to γ-rays flux from cobalt 60 (700 curies) at a dose rate of $4.0\times10^4$ roentgen per hour at $-40°$ C., in which ampoule the condensed system is formed. The ampoule was then opened, and the vinylidene fluoride unreacted and trichlorotrifluoroethane were removed from the ampoule. Thus, 6.0 grams of the white mass of polymerization product was obtained. The yield of polymerization product was 93 percent. Consequently, the average polymerization rate was about 10.3 percent per hour. When another ampoule prepared in the same way as above was exposed for twenty hours to γ-rays flux under the same conditions, the polymerization product was obtained in a yield of 100 percent. These thus-obtained vinylidene fluoride homopolymers had a melting point of 175° C. On the other hand, the commercially available vinylidene fluoride homopolymer obtained by the chemical catalyst-initiated polymerization in an aqueous medium had a melting point of 152° C.

EXAMPLE 2

A mixture of 5.9 grams of vinylidene fluoride and 15.8 grams of trichlorotrifluoroethane in the condensed system was subjected to γ-ray irradiation, in the same way as in example 1, for 3 hours at a dose rate of $4.0\times10^4$ roentgen per hour at $-20°$ C. Thus, 4.9 grams of the white polymerization product was obtained. The polymer yield was 84 percent, and the average polymerization rate was 28 percent per hour. When another mixture of the same composition as above was subjected to γ-ray irradiation for 6 hours under the same conditions as above, the polymer was obtained in a yield of 92 percent. These thus-obtained vinylidene fluoride homopolymers had a melting point of 178° C.

EXAMPLE 3

A mixture of 6.4 grams of vinylidene fluoride and 16.9 grams of dichlorotetrafluoroethane in the condensed system was subjected to γ-ray irradiation, in the same way as in example 1, for 9 hours at a dose rate of $4.0\times10^4$ roentgen per hour at $-40°$ C. Thus, 5.1 grams of the white polymerization product was obtained. The polymer yield was 79 percent, and the average polymerization rate was 8.8 percent per hour. When another mixture of the same composition as above was subjected to γ-ray irradiation for 20 hours under the same conditions as above, the polymer was obtained in a yield of 100 percent. These thus-obtained vinylidene fluoride homopolymers had a melting point of 178° C.

EXAMPLE 4

A mixture of 6.6 grams of vinylidene fluoride and 15.8 grams of octafluorocyclobutane in the condensed system was subjected to γ-ray irradiation, in the same way as in example 1, for 9 hours at a dose rate of $4.0\times10^4$ roentgen per hour at $-40°$ C. Thus, 4.1 grams of the white polymerization product was obtained in a yield of 62 percent. When another mixture of the same composition as above was subjected to γ-ray irradiation for 20 hours under the same conditions as above, the polymer was obtained in a yield of 100 percent. These thus-obtained vinylidene fluoride homopolymers had a melting point of 178° C.

EXAMPLE 5

A mixture of 6.4 grams of vinylidene fluoride and 16.1 grams of trichlorotrifluoroethane in the condensed system was subjected to γ-ray irradiation, in the same way as in example 1, for 3 hours at a dose rate of $4.0\times10^4$ roentgen per hour at $-40°$ C. to give a partially polymerized mixture containing 17 percent of the polymerized product. This partially polymerized mixture containing 17 percent of the polymerized product was subjected to postpolymerization in the same condensed system at $-20°$ C. for 20 hours without further irradiation of γ-rays to give 4.8 grams of the white polymerization product in a yield of 75 percent. The vinylidene fluoride homopolymer so obtained had a melting point of 178° C.

EXAMPLE 6

A mixture of 6.6 grams of vinylidene fluoride and 14.7 grams of dichlorodifluoromethane in the condensed system was subjected to γ-ray irradiation, in the same way as in example 1, for 6 hours at a dose rate of 4.0×10⁴ roentgen per hour at −40° C. to give a partially polymerized mixture containing 6 percent of the polymerized product. This partially polymerized mixture containing 6 percent of the polymerized product was subjected to postpolymerization in the same condensed system at −20° C. for 20 hours without further irradiation of γ-ray to give 4.6 grams of the white polymerization product in a yield of 70 percent. When another partially polymerized mixture containing 6 percent of the polymerized product, which mixture was obtained in the same way as above, was further subjected to successive γ-ray irradiation in the same condensed system for 14 hours at a dose rate of 4.0×10⁴ roentgen per hour at −40° C., the polymer was obtained in a yield of 100 percent.

EXAMPLE 7

A mixture of 10.2 grams of vinylidene fluoride and 5.8 grams of difluoroethane in the condensed system was subjected to γ-ray irradiation, in the same way as in example 1, for 20 hours at a dose rate of $4.0 \times 10_4$ roentgen per hour at −40° C. Thus, 8.6 grams of the white polymerization product for 20 hours at a dose rate of 4.0×10⁴ roentgen per hour at −40° C. Thus, 2.3 grams of the white polymerization product was obtained. The polymer yield was 37 percent, and such value was very low. In contrast therewith, in example 1, of this invention, the polymer yield was a high value of 100 percent.

EXAMPLES 10 to 15

A mixture of vinylidene fluoride and hexafluoropropylene was copolymerized in the following manner. A stainless steel reactor was evacuated and charged with vinylidene fluoride, hexafluoropropylene (comonomer) and various fluorine-containing hydrocarbon solvents shown in table 1 form the condensed system according to this invention. The reactor was then immersed in a bath of dry ice and methanol, and was exposed for twenty hours to γ-ray flux from cobalt 60 (700 curies) at a dose rate of 2.0×10⁴ roentgen per hour at −40° C., in which reactor the condensed system is formed. On completion of the copolymerization reaction, the copolymerization product was recovered after venting off unreacted vinylidene fluoride, hexafluoropropylene and fluorine-containing hydrocarbon solvent from the reactor. The results are shown in the following table 1.

TABLE 1

| Example | Solvent, g. | (a)Vinyl-idene fluoride, g. | (b)Hexa-fluoro-propyl-ene, g. | Mol percent of (a) in (a)+(b) | Copol-ymer, g. | Copol-ymer yield, percent | Mol percent of (a) in copol-ymer |
|---|---|---|---|---|---|---|---|
| 10 | Dichlorotetrafluoroethane | 16.6 | 7.75 | 4.53 | 80.0 | 5.22 | 42.5 | 94.5 |
| 11 | Trichlorotrifluoroethane | 12.0 | 7.15 | 5.00 | 77.0 | 4.32 | 35.6 | 92.5 |
| 12 | Octafluorocyclobutane | 16.3 | 7.15 | 4.61 | 78.4 | 2.91 | 24.7 | 93.7 |
| 13 | Monochlorodifluoromethane | 15.3 | 7.29 | 4.68 | 78.5 | 2.54 | 21.2 | 95.2 |
| 14 | Monochlorodifluoroethane | 14.4 | 7.36 | 4.44 | 77.5 | 3.34 | 28.3 | 93.7 |
| 15 | Difluoroethane | 11.1 | 7.04 | 4.97 | 76.9 | 1.69 | 14.1 | 94.5 | was obtained in a yield of 84 percent. The vinylidene fluoride homopolymer so obtained had a melting point of 178° C.

EXAMPLE 8

A mixture of 6.5 grams of vinylidene fluoride and 16.0 grams of trichloromonofluoromethane in the condensed system was subjected to γ-ray irradiation, in the same way as in example 1, for 9 hours at a dose rate of 4.0×10⁴ roentgen per hour at −40° C. Thus, 3.9 grams of the white polymerization product was obtained in a yield of 60 percent. When another mixture of the same composition as above was subjected to γ-ray irradiation for 20 hours under the same conditions as above, the polymer was obtained in a yield of 98 percent. These thus-obtained vinylidene fluoride homopolymers had a melting point of 175° C.

EXAMPLE 9

A mixture of 8.6 grams of vinylidene fluoride and 7.1 grams of monochlorodifluoromethane in the condensed system was subjected to γ-ray irradiation, in the same way as in example 1, for 20 hours at a dose rate of 4.0×10⁴ roentgen per hour at −40° C. to give 5.5 grams of the white polymerization product in a polymer yield of 64 percent. The vinylidene fluoride homopolymers so obtained had a melting point of 175° C.

COMPARATIVE EXAMPLE 1

6.2 grams of vinylidene fluoride in a condensed system not containing fluorine-containing hydrocarbon solvent was subjected to γ-ray irradiation, in the same way as in example 1,

EXAMPLES 16 to 21

A mixture of vinylidene fluoride, hexafluoropropylene, (monomer) and trichlorotrifluoroethane (solvent) in the condensed system was subjected to γ-ray irradiation in the same way as in example 10 to 15, for 17.5 hours at dose rate of 2.0×10⁴ roentgen per hour at +20° C. The mixture contained 15.26 grams of trichlorotrifluoroethane. The results are shown in the following table 2. By these examples, it is shown that the composition of the copolymerization product changes continuously according as the mol ratio of vinylidene fluoride and hexafluoropropylene in the feed.

TABLE 2

| Example | (a)Vinyl-idene fluoride, g. | (b)Hexa fluoro-propylene, g. | Mol percent of (a) in (a)+(b) | Copol-ymer, g. | Copol-ymer yield, percent | Mol percent of (a) in copol-ymer |
|---|---|---|---|---|---|---|
| 16 | 6.95 | 1.98 | 89.2 | 8.22 | 92.0 | 91.4 |
| 17 | 5.73 | 3.70 | 78.4 | 7.19 | 76.2 | 88.1 |
| 18 | 4.86 | 4.87 | 70.0 | 5.32 | 54.7 | 86.0 |
| 19 | 3.22 | 7.49 | 49.9 | 2.33 | 20.9 | 82.0 |
| 20 | 2.50 | 8.27 | 41.5 | 2.10 | 19.5 | 75.0 |
| 21 | 0.96 | 10.38 | 17.8 | 2.04 | 18.0 | 60.6 |

EXAMPLES 22 to 28

A mixture of vinylidene fluoride, various unsaturated monomers shown in table 3 and trichlorotrifluoroethane (solvent) in the condensed system was subjected to γ-ray irradiation, in the same way as in example 10 to 15, for 12 hours at a dose rate of 2.0×10⁴ roentgen per hour at +20° C. The mixture contained 18.74 grams of trichlorotrifluoroethane. The results are shown in the following table 3.

TABLE 3

| Example | Monomer | (a)Vinyl-idene fluoride, g. | (b)Mono-mer, g. | Mol percent of (a) in (a)+(b) | Copol-ymer, g. | Copol-ymer yield, percent | Mol percent of (a) in copol-ymer |
|---|---|---|---|---|---|---|---|
| 22 | Chlorotrifluoroethylene | 2.82 | 5.07 | 50.3 | 4.63 | 58.7 | 62.7 |
| 23 | Tetrafluoroethylene | 5.63 | 4.27 | 67.3 | 9.42 | 95.2 | 68.3 |
| 24 | Vinyl fluoride | 3.22 | 2.01 | 53.5 | 0.77 | 14.7 | 19.4 |
| 25 | Ethylene | 2.64 | 1.24 | 48.2 | 0.10 | 2.6 | 19.9 |
| 26 | Vinyl chloride | 2.90 | 2.90 | 49.4 | 3.76 | 64.8 | 34.4 |
| 27 | Vinyl acetate | 2.72 | 4.21 | 46.5 | 3.26 | 47.0 | 8.1 |
| 28 | Methyl methacrylate | 2.90 | 4.37 | 51.0 | 4.19 | 57.6 | 8.1 |

EXAMPLE 29

A mixture 2.49 grams of vinylidene fluoride, 2.51 grams of tetrafluoroethylene; 3.32 grams of hexafluoropropylene and 18.74 grams of trichlorotrifluoroethane (solvent) in the condensed system was subjected to γ-ray irradiation, in the same way as in example 10 to 15, for 12 hours at a dose rate of $2.0\times10^4$ roentgen per hour at +20° C. Mol percent of vinylidene fluoride, tetrafluoroethylene, and hexafluoropropylene in a monomer mixture comprising vinylidene fluoride, tetrafluoroethylene and hexafluoropropylene were 45.2, 29.2 and 25.7, respectively. 5.26 grams of copolymerization product was obtained (i.e., the copolymer yield was 63.2 percent). Mol percent of vinylidene fluoride, tetrafluoroethylene, and hexafluoropropylene in the copolymer so obtained were 60.7, 32.6, and 6.7, respectively.

COMPARATIVE EXAMPLE 2

A mixture of 3.01 grams of vinylidene fluoride and 7.27 grams of hexafluoropropylene in a condensed system not containing fluorine-containing hydrocarbon solvent was subjected to γ-ray irradiation, in the same way as in example 19, for 12 hours at a dose rate of $2.0\times10^4$ roentgen per hour at +20° C.

In consequence, only 0.29 grams of copolymer was obtained (i.e., the copolymer yield was 2.8 percent), and the mol percent of vinylidene fluoride in the copolymer so obtained was 81.9. In this comparative example, the copolymer yield is extremely low. In contrast thereto, in example 19 of this invention the copolymer yield is 20.9 percent and remarkably good.

What we claim is:

1. A process for homopolymerizing vinylidene fluoride or copolymerizing it with at least one other ethylenically unsaturated compound of formula ZZ'C=CYY' wherein Z and Z' are H or F or Cl, Y and Y' are the same or different and are H, F, Cl, an aromatic radical of up to seven carbon atoms, straight-chain and branched alkyl, haloalkyl and alkenyl of up to four carbon atoms, —CN, RCO—, ROCO— wherein R is alkyl of up to seven carbon atoms, and Y, Y', Z and Z' are the same or different, wherein the polymerization reaction is carried out in a condensed system containing in the liquid form the material to be polymerized and at least one fluorine-containing saturated aliphatic or cycloaliphatic hydrocarbon solvent selected from the group consisting of fluorochlorohydrocarbons and fluorohydrocarbons, in a temperature and pressure range in which the liquid form is retained, by the irradiation of ionizing radiation, at a dose rate of between $1\times10^2$ and $5\times10^6$ roentgen per hour.

2. A process for homopolymerizing vinylidene fluoride or copolymerizing it with at least one other ethylenically unsaturated compound of formula ZZ'C CYY' wherein Z and Z' are H or F or Cl, Y and Y' are the same or different and are H, F, Cl, an aromatic radical of up to seven carbon atoms, straight-chain and branched alkyl, haloalkyl and alkenyl of up to four carbon atoms, —CN, RCO—ROCO— and RCOO wherein R is alkyl of up to seven carbon atoms, and Y, Y', Z and Z' are the same or different, which comprises partially polymerizing the polymerizable material in a condensed system containing in the liquid form the polymerizable material and at least one fluorine-containing hydrocarbon solvent selected from the group consisting of fluorochlorohydrocarbons and fluorohydrocarbons, by the irradiation of ionizing radiation at a dose rate between $1\times10^2$ and $5\times10^6$ roentgen per hour in a temperature range in which the condensed liquid system is retained, under conditions that polymerization is kept below 30 percent and then subjecting the partially polymerized product to postpolymerization in the same condensed liquid system at temperatures at which the same condensed liquid system is retained, without further irradiation of the ionizing radiation and without use of catalyst and separating the polymer thus formed from said liquid mixture.

3. A process as claimed in claim 2, wherein the ethylenically unsaturated compound is selected from the group consisting of tetrafluorethylene, hexafluoropropylene, and chlorotrifluoroethylene.

4. The process according to claim 1 which is conducted continuously.

5. A process as claimed in claim 1, wherein the temperature range is from about −80° C. to about +70° C.

6. A process as claimed in claim 1, wherein the polymerization reaction is carried out at temperatures from about −60° C. to about +30° C.

7. A process as claimed in claim 1, wherein the polymerization reaction is carried out at a total dose of the ionizing radiation in the range of from $5\times10^2$ to $1\times10^6$ roentgen.

8. A process as claimed in claim 1, wherein the fluorine-containing saturated hydrocarbon solvent is selected from the group consisting of saturated fluorochlorinated and fluorinated hydrocarbons having one to four carbon atoms per molecule.

9. A process as claimed in claim 7, wherein the fluorine-containing saturated hydrocarbon solvent is selected from the group consisting of saturated perfluorochlorinated and perfluorinated hydrocarbons having one to four carbon atoms per molecule.

10. A process as claimed in claim 8, wherein the fluorine-containing saturated hydrocarbon solvent is selected from the group consisting of trichlorotrifluoroethanes, dichlorotetrafluoroethanes, monochloropentafluoroethane, trichloromonofluoromethane, dichlorodifluoromethane, and octafluorocyclobutane.

11. A process as claimed in claim 1, wherein the fluorine-containing saturated hydrocarbon solvent is used in the range of at least 0.1 mol per mol of the material to be polymerized.

12. A process as claimed in claim 1, wherein the other copolymerizable compound is selected from the group consisting of vinyl fluoride, tetrafluoroethylene, hexafluoropropylene, chlorotrifluoroethylene, ethylene, propylene, butadiene. styrene, vinyl acetate, vinyl chloride, vinylidene chloride, isobutylene, acrylonitrile, methacrylonitrile, alkyl acrylates, and alkyl methacrylates.

13. A process as claimed in claim 1, wherein the other copolymerizable compound is selected from the group consisting of tetrafluoroethylene, hexafluoropropylene, chlorotrifluoroethylene, vinyl chloride, vinyl acetate and methyl methacrylate.

14. A process as claimed in claim 12, wherein the other copolymerizable compounds to be used in the production of a terpolymer thereof with vinylidene fluoride are hexafluoropropylene and tetrafluoroethylene.

15. A process as claimed in claim 2, wherein the yield of the partially polymerized product obtained in the first partial polymerization step is less than 30 percent by weight of the starting polymerizable material used.

16. A process as claimed in claim 2, wherein the postpolymerization is carried out at temperatures from about −40° C. to about +50° C.

17. A process as claimed in claim 2, wherein the fluorine-containing saturated hydrocarbon solvent is selected from the group consisting of trichlorotrifluoroethanes, dichlorotetrafluoroethanes, monochloropentafluoroethane, trichloromonofluoromethane, dichlorodifluoromethane, and octafluorocyclobutane.

* * * * *